United States Patent [19]

Gartner

[11] Patent Number: 5,299,021
[45] Date of Patent: Mar. 29, 1994

[54] COPIER WITH MODE FOR COLLATING OFF A PLATEN

[75] Inventor: Margaret C. Gartner, Rochester, N.Y.

[73] Assignee: Eastman Kodak Company, Rochester, N.Y.

[21] Appl. No.: 691,241

[22] Filed: Apr. 25, 1991

[51] Int. Cl.⁵ ............................................. H04N 1/21
[52] U.S. Cl. ..................................... 358/401; 358/444
[58] Field of Search ............... 358/296, 300, 404, 403, 358/444, 452, 401; 355/205, 206, 207, 313, 314, 319, 323

[56] References Cited

U.S. PATENT DOCUMENTS

| | | |
|---|---|---|
| 4,013,876 | 3/1977 | Anstin . |
| 4,099,254 | 7/1978 | Andrews ............................. 355/319 |
| 4,268,159 | 5/1981 | Tashiro ............................... 358/300 |
| 4,302,782 | 11/1981 | Gunning et al. ..................... 358/296 |
| 4,453,841 | 6/1984 | Bobick et al. . |
| 4,505,576 | 3/1985 | Sugiura et al. . |
| 4,571,069 | 2/1986 | Kimura ............................... 355/206 |
| 4,589,035 | 5/1986 | Yamanishi et al. ................. 358/296 |
| 4,731,672 | 3/1988 | Sugishima .......................... 358/296 |
| 4,733,275 | 3/1988 | Sugiura et al. . |
| 4,843,428 | 6/1989 | Sugiura et al. ..................... 358/300 |
| 4,868,758 | 9/1989 | Kokubu . |
| 4,884,149 | 11/1989 | Shoji et al. ......................... 358/300 |
| 4,958,232 | 9/1990 | Sugiura et al. ..................... 358/300 |
| 4,982,234 | 1/1991 | Fillion ................................ 355/313 |
| 5,058,037 | 10/1991 | Kageyama ......................... 395/116 |

Primary Examiner—Edward L. Coles, Sr.
Assistant Examiner—Scott A. Rogers
Attorney, Agent, or Firm—Lawrence P. Kessler

[57] ABSTRACT

A copier permits an operator to scan all pages of a multiple-page original document, and to individually program special feature instructions for each special page, before printing begins. Each original page is scanned separately on a platen, with the image data and special feature instructions being stored in memory before the job is printed. A proof copy of the entire set or of selected pages may be obtained before printing begins.

10 Claims, 4 Drawing Sheets

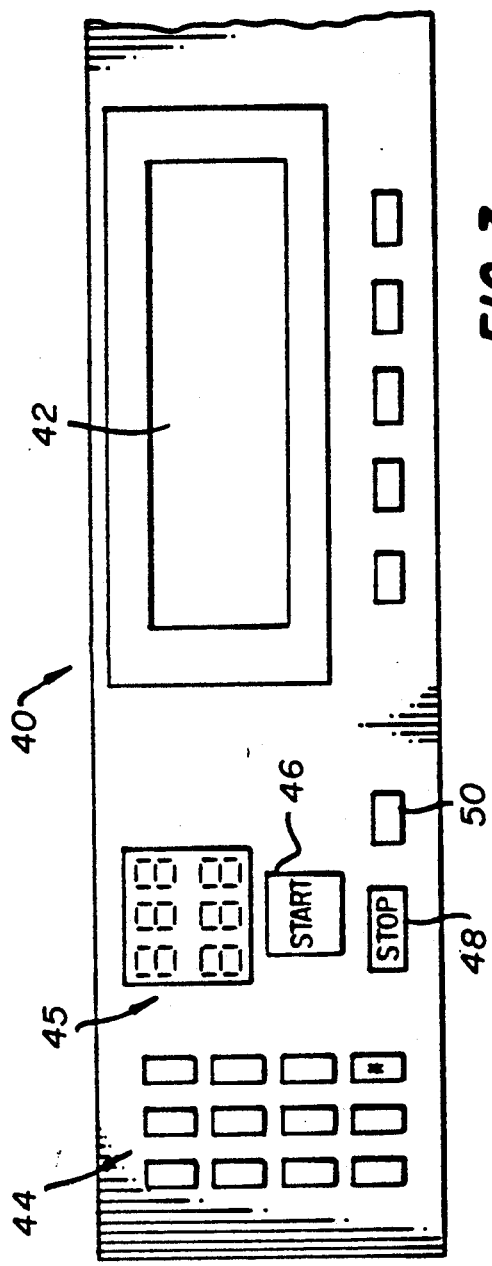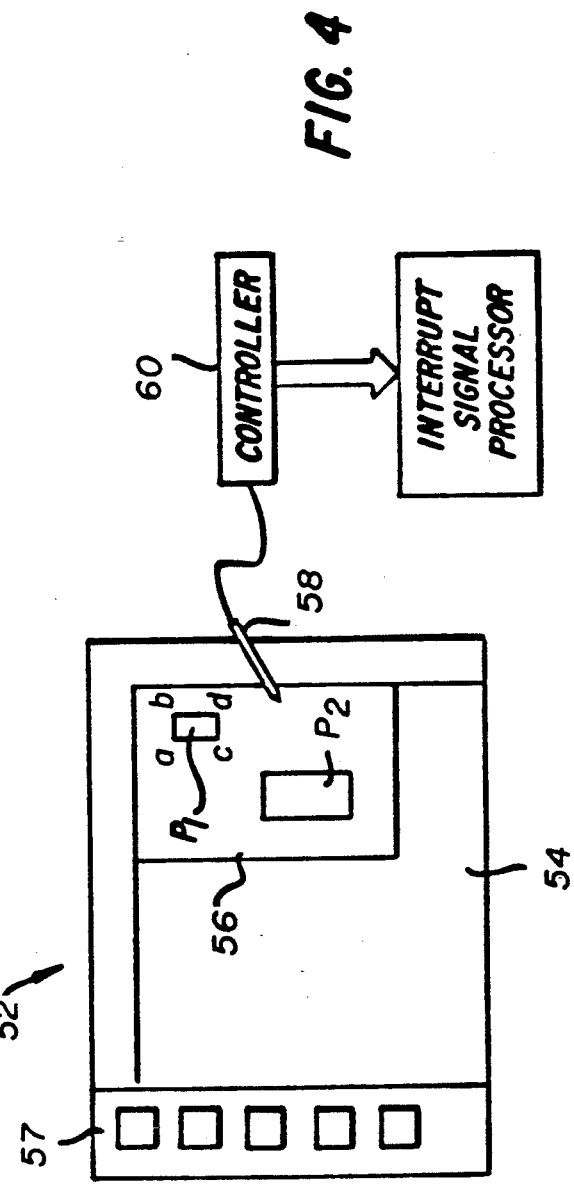

[COLLATE SETS USING PLATEN] MODE
 MAKE JOB SETUP SELECTIONS ON CONTROL PANEL, FEATURE MENU AND EDITING MENU.
THEN PRESS [JOB SETUP DONE].

| JOB SETUP DONE |

FIG. 6

PLACE FIRST ORIGINAL ON PLATEN
MAKE PAGE SPECIAL FEATURES SELECTION
THEN PRESS [START] TO SCAN.

FIG. 7

PLACE NEXT ORIGINAL ON PLATEN
MAKE PAGE SPECIAL FEATURES SELECTIONS
THEN PRESS [START] TO SCAN
    OR
PRESS [ALL ORIGINALS SCANNED].

| ALL ORIGINALS SCANNED |

FIG. 8

COPIER WITH MODE FOR COLLATING OFF A PLATEN

BACKGROUND OF THE INVENTION

1. Technical Field

This invention relates generally to document copiers having an exposure platen at which original pages are scanned, and more particularly to such copiers which allow the operator to scan each page individually on the platen before copying begins.

2. Background Art

There are known copiers which have exposure platens from which original pages are scanned to convert the images thereon to a series of digital data signals for use by a marking engine to produce collated copy sets of the original document. The original pages may be advanced to the exposure platen by an automatic document feeder, or the operator may place each original page individually on the platen. Some copiers provide both, so that the operator can choose the most convenient form.

In some such copiers, the operator is provided with "special features" options to adjust the images that are to be produced. For example, a designated original document (referred to herein as a "special page") to be copied may be placed face up on an exposure platen, whereat a wand is used by an operator to identify locations on the original document which define an area for special treatment such as screening, erase, annotation, spot coloration (also called "accent coloring"), relocation in the page format, etc.

Copiers are also known that include a multiple-page buffer memory for electronically storing scanned image data and printing instructions for a plurality of pages of a job. The stored pages can be printed as often as desired to produce a plurality of collated copy sets. In known copiers, the first copy set is produced as the original pages are scanned, edited, and sent to buffer memory.

There are several disadvantages to this procedure. Whenever the marking engine is operating to produce a copy set, there is a risk of malfunction (say, a paper jam) which would result in a shut-down of the marking engine and require operator attention. Any such malfunction as the operator is in the process of scanning original pages and programming the apparatus with special feature instructions for each special page, would tend to confuse the operator, slowing recovery from the malfunction situation and producing a risk of error when the operator resumes the scanning operation.

Another disadvantage of the conventional system relates to the amount of time that it takes an operator to scan original pages and program the apparatus with special feature instructions for each special page. High-speed electrostatographic copiers have a "skip cycle" mode in which the marking engine continues to operate until the image for the next page to be printed is available. In the skip cycle mode, the marking engine continues to run, but without paper feed, and with appropriate adjustment to charging, toning, erasing, and cleaning processes. Extended skip cycling while an operator scans original pages and programs the apparatus with special feature instructions for each special page wastes energy and causes undo wear and tear on the marking engine. On the other hand, shutting down the marking engine and restarting it between pages can cause long-term reliability problems.

DISCLOSURE OF INVENTION

Accordingly, it is an object of the present invention to provide a copier which permits an operator to enter special feature instructions and to scan all pages of a multiple-page original document individually on a platen before printing begins.

It is another object of the present invention to provide a copier which permits an operator to scan original pages and program the apparatus with special feature instructions for each special page before printing begins.

It is still another object of the present invention to provide a copier which permits an operator to scan original pages and program the apparatus with special feature instructions for each special page and to request a proof copy for selected pages before printing begins.

It is yet another object of the present invention to provide a copier which permits an operator to scan original pages and program the apparatus with special feature instructions for each special page, to request a proof set, and to modify the job before making additional sets.

Scanning off the platen allows the operator the flexibility of changing or editing pages or areas on a page as individual pages are scanned. Each original page is scanned separately on the platen, with the image being stored in memory before the job is printed. A proof copy of a page can be obtained before the job is printed. Printing does not begin until all the original pages of a multiple-page document have been scanned. Special features can be selected for each page different than the default page level settings for the job.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 3 is a view of an operator control panel of the copier of FIGS. 1 and 2;

FIG. 4 is a schematic view of a digitizer tablet which is part of the copier of FIGS. 1-3;

FIGS. 6 to 8 are views of messages displayed on a screen of the copier of FIGS. 1-5.

BEST MODE FOR CARRYING OUT THE INVENTION

Because copiers are well known, the present description will be directed, in particular, to elements forming part of or cooperating more directly with the present invention. Apparatus not specifically shown or described herein are selectable from those known in the prior art.

Figure 1:
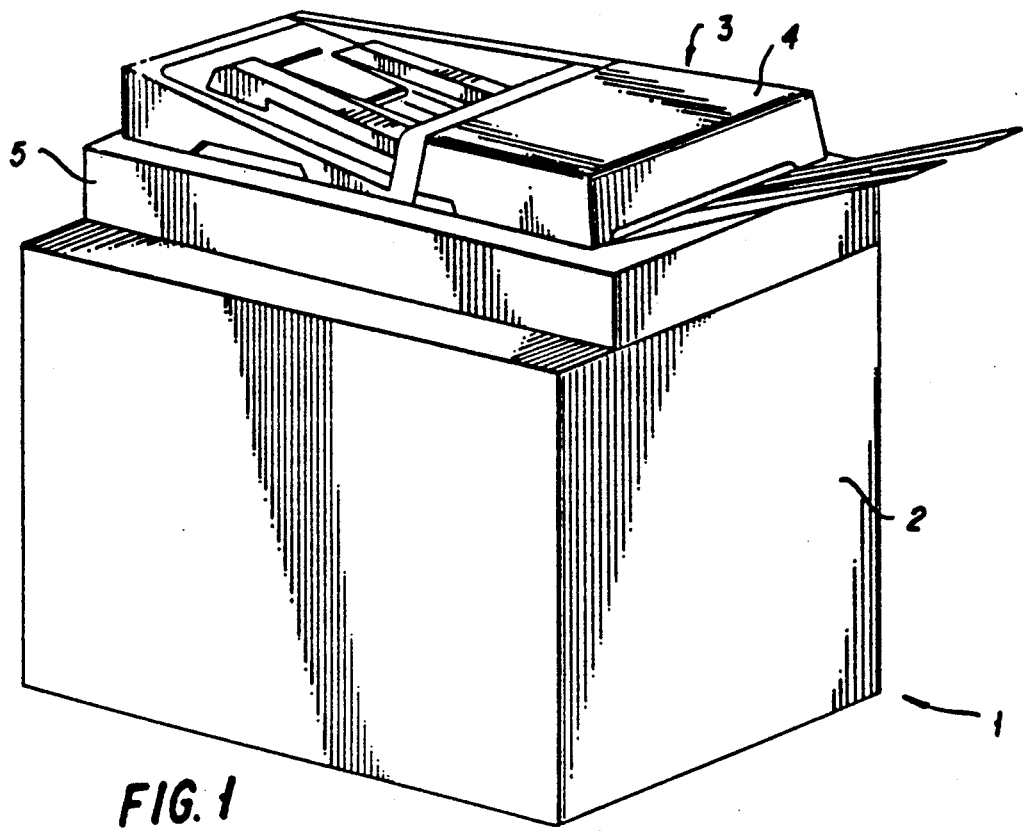
FIG. 1 is a perspective view of one embodiment of an electrophotographic copier for practice of the present invention.

With reference now to FIG. 1, a copier 1 is made up of a marking engine 2 and a scanner 3. The scanner includes a document handler 4 and an optical system enclosed in an optics housing 5. Details of the scanner are disclosed in commonly assigned U.S. Patent application Ser. No. 137,776 filed in the names of Giannetti et al. on Dec. 24, 1987. The disclosure of that application is incorporated herein by reference. A document editor such as a digitizer tablet is incorporated in the scanner, and will be further explained below.

Figure 2:
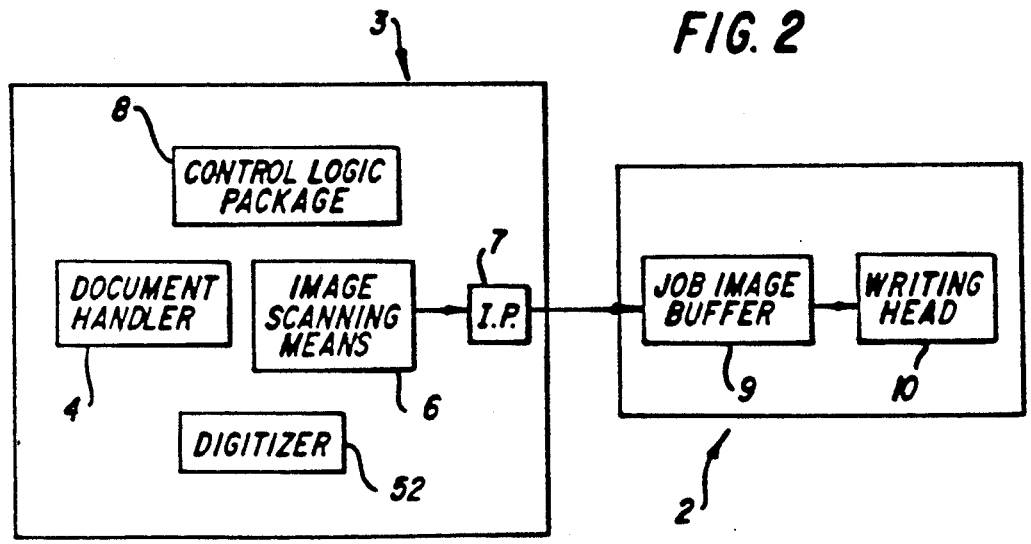
FIG. 2 is a schematic block diagram of the copier of FIG. 1.

Referring to FIG. 2, scanner 3 consists of automatic document handler 4 for stream feeding pages of a multiple-page original document to be automatically read by a solid-state device to such as a linear array of charge-coupled devices. The solid state device scans the input original pages, converting their images to electronic bit stream data in page format for input to marking engine 2. This data may be manipulated by image-processing electronics 7 having an image-editing algorithm to effect special features.

Scanner 3 also includes a control logic package 8 having an operator control panel for the operator to input functions and for messages received from the copier. Special feature instructions are input to scanner image-processing electronics 7, and information for finishing and processing of jobs will be sent to marking engine 2. The package consists of control software, interface software, and logic hardware.

Marking engine 2 is the output device that will receive and store bit stream data in its job image buffer 9 and appropriately process that data for copies. The job image buffer stores the bit stream data for each of the pages being copied and delivers these data to a writing head 10 as necessary for sequential copying. The marking engine incorporates the paper handling, photoconductor and process hardware, and writing head 10.

FIG. 3 illustrates an operator control panel 40 which is part of control logic package 8, scanner 3. Panel 40 includes a display 42 upon which messages are shown to indicate to the operator what mode the copier is operating in, what action should be taken next, where malfunctions may be located in the copier, etc. Panel 40 includes soft keys below display 42 for inputting special feature instructions, a key pad 44, a digital display 45, a "start" button 46, a "reset/stop" button 48, and a "proof" button 50.

FIG. 4 shows a digitizer 52 having an exposure platen 54 which in this example may serve as the support for digitizing an original document 56. A corner of the original document is registered in one corner of the platen to establish a coordinate reference system for inputting information into temporary memory regarding the location of the areas to be operated upon by special feature instructions. Digitizers are well known in the art, and the reader is referred to various U.S. Pat. Nos., including 4,562,485, 4,617,596, 4,674,861, and 4,740,818 as examples of copiers with image-editing features.

Through display 42, requests are made that the operator place original document sheet 56 face-up upon exposure platen 54. FIG. 4 shows the upper right corner of the original document sheet registered with a corner reference of the platen. However, one might prefer to adapt the machine so as to register the "staple" corner of the sheet with the appropriate corner reference of the platen. The operator is then requested to select which special treatment is desired; i.e., screening, erase, annotation, spot coloration (also called "accent coloring"), relocation in the page format, etc.

As an example to explain the operation of the editing mode, it is assumed that the original document includes an area $P_1$ which is to be enlarged and relocated in the region $P_2$ of the copy. Once the original document is registered such as with the "staple" corner in a reference corner of the exposure platen, the operator digitizes the "begin" command on a command strip 57 to call up a stored program which requests, through display 42 that the operator indicate by means of a conventional wand 58 the position of areas $P_1$ and $P_2$ relative to the reference corner. The wand may be used to touch the sheet at the four corner points of each area. Preferably the points are touched in an order such that a straight line joins adjacent points as in the order a, b, c, and d to define a rectangle. Alternatively, the rectangles can be defined by touching only two diagonally opposed corners. The computer control for the digitizing tablet may also be programmed to accept inputs of area data to define other geometrical shapes such as circles.

A digitizer controller 60 knowing the times of emitting of the signals and their receipt, can through triangulation principles calculate the location of a point on the platen relative to a known point such as the reference corner shown. Controller 60 is programmed to recognize that the area is bordered by the straight lines joining adjacent points a, b, c, and d and the coordinates for areas $P_1$ and $P_2$ can be thus calculated and stored in temporary memory.

The document is flipped over on the exposure platen with the document sheet appropriately registered such as with the "staple" corner in another reference corner of the platen. Suitable logic or computing means is provided to translate the area defining points determined during the editing mode to points on an image frame of the marking engine.

Usually, an operator will use the automatic document feeder to advance original pages of a multiple-page original to the platen. There are several instances where this would not be the most practical mode. For example, if a multiple-page original document has several torn, stapled, or odd size pages; pages that require editing; and/or pages in bound documents, the automatic document feeder would be impossible or impractical due to the frequent interruptions.

Figure 5:
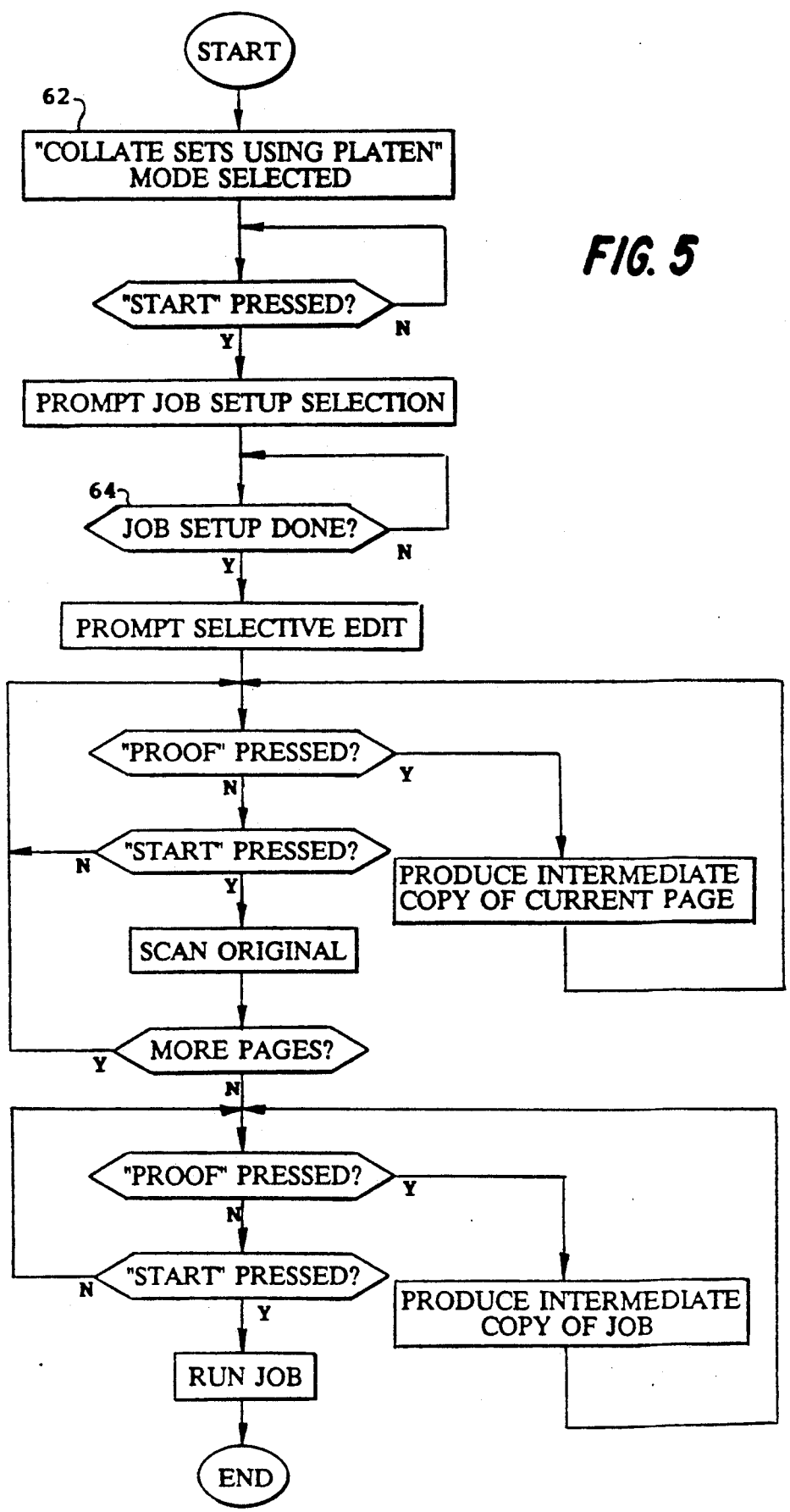
FIG. 5 is a logic flow chart of the operation of the copier of FIGS. 1-5.

When such a job is to be copied, the operator may wish to invoke a special mode which will permit making collated sets using the platen, and which will delay printing until all the original pages have been scanned. Such a mode may, for example, be called "Collate Sets Using Platen" mode. When the mode is selected (step 62 of FIG. 5), display 42 will prompt the operator to make job setup selections on control panel 40. An example of the prompt message is shown in FIG. 6. Any setup feature selections made before the operator presses the softkey under the "JOB SETUP DONE" phrase (step 64) will apply to all pages of the set.

Once the job setup is completed, display 42 will prompt the operator for the first page of the original document, such as by the screen of FIG. 7. If a page requires special features other than the default page level features for the job, the operator enters the page level special features for that page.

If editing changes are required, the original page is placed face up on the platen and normal editing procedures are followed. The original page is next placed face down on the platen and other features are selected for that individual page. To see the results of the editing, PROOF button 50 is pressed to receive an intermediate copy of the final output of the current page.

When the START button is pressed, the original on the platen will be scanned, and the image signal stored in memory. After the original is scanned, the screen will display a message such as shown in FIG. 8, advising the operator to proceed to the next original page or to press the softkey under the "ALL ORIGINALS SCANNED" phrase.

Once all of the pages of the original document have been scanned into the memory, the operator may produce a proof copy set of all pages scanned by pressing the "PROOF" button on the control panel. Alternatively, the operator may begin the copy run by pressing the "START" button. Once the job is completed, the special mode which permits making collated sets using the platen will be turned off.

The invention has been described in detail with particular reference to preferred embodiments thereof, but it will be understood that variations and modifications can be effected within the spirit and scope of the invention.

What is claimed is:

1. A document copier comprising
   an exposure platen adapted to receive a multiple-page original document one page at a time;
   image-forming means for producing copy pages from electronic bit stream image data;
   a memory capable of storing electronic bit stream image data for the plurality of pages of a multiple-page original document;
   means for supplying image data from the memory to the image-forming means to produce a plurality of copy sets of the pages stored in the memory;
   a scanner adapted to convert images on original document pages received by the platen to electronic bit stream image data and to input the image data to the memory;
   means, operable in a first mode, for sending image data to the image-forming means for producing a first copy set as the image data is sent to the memory for storage and, operable in a second mode, for sending image data to the image-forming means only after the entire multiple-page original document has been stored in the memory; and
   operator actuatable means for selectively setting said image data sending means in said first mode or said second mode.

2. A document copier as set forth in claim 1 wherein said means for supplying image data from the memory to the image-forming means is adapted to supply the image data in a form to produce a plurality of collated copy sets of the pages stored in the memory.

3. A document copier as set forth in claim 1 wherein said scanner includes an automatic document feeder for stream feeding pages of the multiple-page original document to the platen, the document feeder being adapted to permit manual placement of pages on the platen for scanning.

4. A document copier as set forth in claim wherein said scanner includes:
   image-editing means for receiving special feature instructions adjusting images to be produced on the copy pages produced; and
   image-processing electronics for changing the electronic bit stream image data inputted to the memory according to the special feature instructions.

5. A document copier as set forth in claim 4 wherein said special feature instructions include data which specifies special features and data that defines areas of a page for treatment by the special feature data.

6. A document copier as set forth in claim 5 wherein said image-editing means is adapted to receive both special feature instructions for the entire multiple-page original document and special feature instructions for designated pages of the multiple-page original document.

7. A document copier as set forth in claim 6 wherein said image-editing means is adapted to receive special feature instructions for the entire multiple-page original document before the first page of the document is scanned, and is adapted to receive special feature instructions for designated pages of the multiple-page original document immediately before the associated designated page is scanned.

8. A document copier as set forth in claim 1 further comprising means for producing a proof copy of selected pages stored in the memory.

9. A document copier as set forth in claim 1 further comprising means for producing a proof copy set of all pages stored in the memory.

10. A document copier comprising:
    an exposure platen adapted to receive a multiple-page original document one page at a time;
    a memory capable of storing electronic bit stream image data for the plurality of pages of a multiple page original document;
    means for supplying image data from the memory to the image-forming means to produce a plurality of copy sets of the pages stored in the memory;
    a scanner adapted to convert images on original document pages received by the platen to electronic bit stream image data and to input the image data to the memory, said scanner including image-editing means for receiving special feature instructions adjusting images to be produced on the copy pages produced, said image-editing means being adapted to (a) receive special feature instructions for the entire multiple-page original document before the first page of the document is scanned and (b) receive special feature instructions for designated pages of the multiple-page original document immediately before the associated designated page is scanned;
    means, operable in a first mode, for sending image data to the image-forming means for producing a first copy set as the image data is sent to the memory for storage and, operable in a second mode, for sending image data to the image-forming means only after the entire multiple-page original document has been stored in the memory; and
    operator actuatable means for selectively setting said image data sending means in said first mode or said second mode.

* * * * *